US012809353B2

(12) United States Patent
Hoernicke et al.

(10) Patent No.: US 12,809,353 B2
(45) Date of Patent: Nov. 24, 2026

(54) OPTIMIZING THE EXECUTION OF INDUSTRIAL PROCESSES ON MODULAR PLANTS

(71) Applicant: ABB Schweiz AG, Baden (CH)

(72) Inventors: Mario Hoernicke, Landau (DE); Sten Gruener, Laudenbach (DE); Nicolai Schoch, Heidelberg (DE); Nafise Eskandani, Rossdorf (DE); Katharina Stark, Weinheim (DE)

(73) Assignee: ABB Schweiz AG, Baden (CH)

( * ) Notice: Subject to any disclaimer, the term of this patent is extended or adjusted under 35 U.S.C. 154(b) by 342 days.

(21) Appl. No.: 18/606,696

(22) Filed: Mar. 15, 2024

(65) Prior Publication Data

US 2024/0319716 A1 Sep. 26, 2024

(30) Foreign Application Priority Data

Mar. 20, 2023 (EP) .................................... 23162878

(51) Int. Cl.
*G05B 19/418* (2006.01)

(52) U.S. Cl.
CPC . *G05B 19/41835* (2013.01); *G05B 19/41845* (2013.01)

(58) Field of Classification Search
None
See application file for complete search history.

(56) References Cited

U.S. PATENT DOCUMENTS 7,539,630 B2 * 5/2009 Crampton ............ G06Q 20/203 705/26.1
12,602,345 B2 * 4/2026 Hyatt .................. G06F 13/4221
2005/0154625 A1 7/2005 Chua et al.
2011/0276165 A1 * 11/2011 Ko ..................... G05B 23/0245 700/104
2015/0006226 A1 * 1/2015 Smith .............. G06Q 10/06313 705/7.23
2022/0121181 A1 4/2022 Sobalvarro et al.
2022/0164725 A1 5/2022 Schoch et al.
(Continued)

OTHER PUBLICATIONS

European Patent Office, Extended European Search Report in European Patent Application No. 23162878.5, 9 pp. (Aug. 28, 2023).

*Primary Examiner* — Ariel Mercado-Vargas
(74) *Attorney, Agent, or Firm* — Fitch Even Tabin & Flannery LLP

(57) ABSTRACT

A computer-implemented method for optimizing execution of an industrial process includes providing a set of resource indicators, each being indicative of an amount of a resource that is required and/or produced by virtue of a particular service being in a particular state; determining a set of candidate programs for execution of the process, each candidate program having a sequence of states of services of process modules such that the sequence accomplishes the industrial process, and the resource requirements of all services in the sequence are fulfilled; determining a set of overall resource requirements for executing the industrial process according to the candidate program; determining a figure of merit for the candidate program; and selecting a candidate program with the best figure of merit as the optimal program for executing the given industrial process.

11 Claims, 2 Drawing Sheets

(56) References Cited

U.S. PATENT DOCUMENTS

| | | | | |
|---|---|---|---|---|
| 2023/0044522 | A1* | 2/2023 | Lu | G05B 23/0294 |
| 2023/0229146 | A1* | 7/2023 | Shimada | G05B 19/41865<br>700/101 |

* cited by examiner

OPTIMIZING THE EXECUTION OF INDUSTRIAL PROCESSES ON MODULAR PLANTS

CROSS-REFERENCE TO RELATED APPLICATIONS

The instant application claims priority to European Patent Application No. 23162878.5, filed Mar. 20, 2023, which is incorporated herein in its entirety by reference.

FIELD OF THE DISCLOSURE

The present disclosure relates to the execution of industrial processes on modular process plants that are composed from a pool of available modules.

BACKGROUND OF THE INVENTION

Modular process plants allow a plant operator to switch between producing different products. For example, it might take only a few weeks to produce a year's supply of each particular product. In this case, it is not economical in terms of hardware and in terms of space to have a fixed plant for each product. Rather, when switching to manufacturing a new product, the right process modules are picked from a pool of available modules to form a plant that produces this product. This means that some process modules in the pool of available modules might be re-used in multiple different plants. This also means that, depending on the size of the pool of modules, there may be multiple configurations of modules that produce a particular desired product.

BRIEF SUMMARY OF THE INVENTION

In one general aspect, the present disclosure describes systems and methods that exploit flexibilities for optimizing the execution of a given process on a modular industrial plant towards a given goal.

The present disclosure describes a computer-implemented method for optimizing the execution of a given industrial process on a modular industrial plant. The modular industrial plant comprises a plurality of modules selected from a pool of available process modules. Each process module is configured to provide one or more services. A service can be any action that works towards the completion of the process, such as milling, heating or stirring of a substance, or reacting two or more educt substances to form a product substance. A service can also be something that provides a prerequisite for actions that work towards the completion of the process. That is, most services perform some work on a substance or other medium that is part of the process and will eventually go into the final product of the process. But this is not required. For example, a cooling module may provide cooling water to other modules without directly affecting a substance that goes into the final product.

Each service has a state. In a simple example, the state can be "active" or "inactive". More complex services may involve several stages, and each such stage may correspond to another distinct state of the module. For example, a process module that reacts two educt substances with each other may first fill in batches of the educt substances, heat the mixture to the intended reaction temperature, transition to a state where the exothermic reaction supports itself and requires no further heating, and then proceed to the discharging of the product. The fact that the service is in a particular state manifests itself in the service (and thus the process module) requiring and/or producing different kinds of resources. In a simple analogy, a washing machine has the states of filling, heating, washing, pumping and spinning. In the filling state, the machine draws water from the tap. In the heating state, it draws much electricity from the mains to heat the water. During washing, much less electricity is required because there is mainly the motor for rotating the drum to power, at a low speed. During pumping, the machine emits waste water as a "product". During spinning, waste water is produced as well, and the motor consumes more energy for rotating the drum at high speed.

The analogy of the washing machine also illustrates that, by modifying the sequence of states, resource consumption may be impacted. Today's washing machines have an energy saver program. In this program, less water is used, meaning that the machine remains in the filling state and in the heating state for a shorter time. But on the other hand, the machine will then remain in the washing state for a much longer time. The analogy also shows that the possibility to modify the sequence of states is limited: in this example, it does not make sense to change the order of the sequence of states.

Therefore, in the course of the method, for each state of each service provided by each of the available process modules, a set of resource indicators is provided. Each resource indicator is indicative of an amount of a resource that is required and/or produced by virtue of this particular service being in this particular state.

BRIEF DESCRIPTION OF THE SEVERAL VIEWS OF THE DRAWING(S)

DETAILED DESCRIPTION OF THE INVENTION

Figure 1:
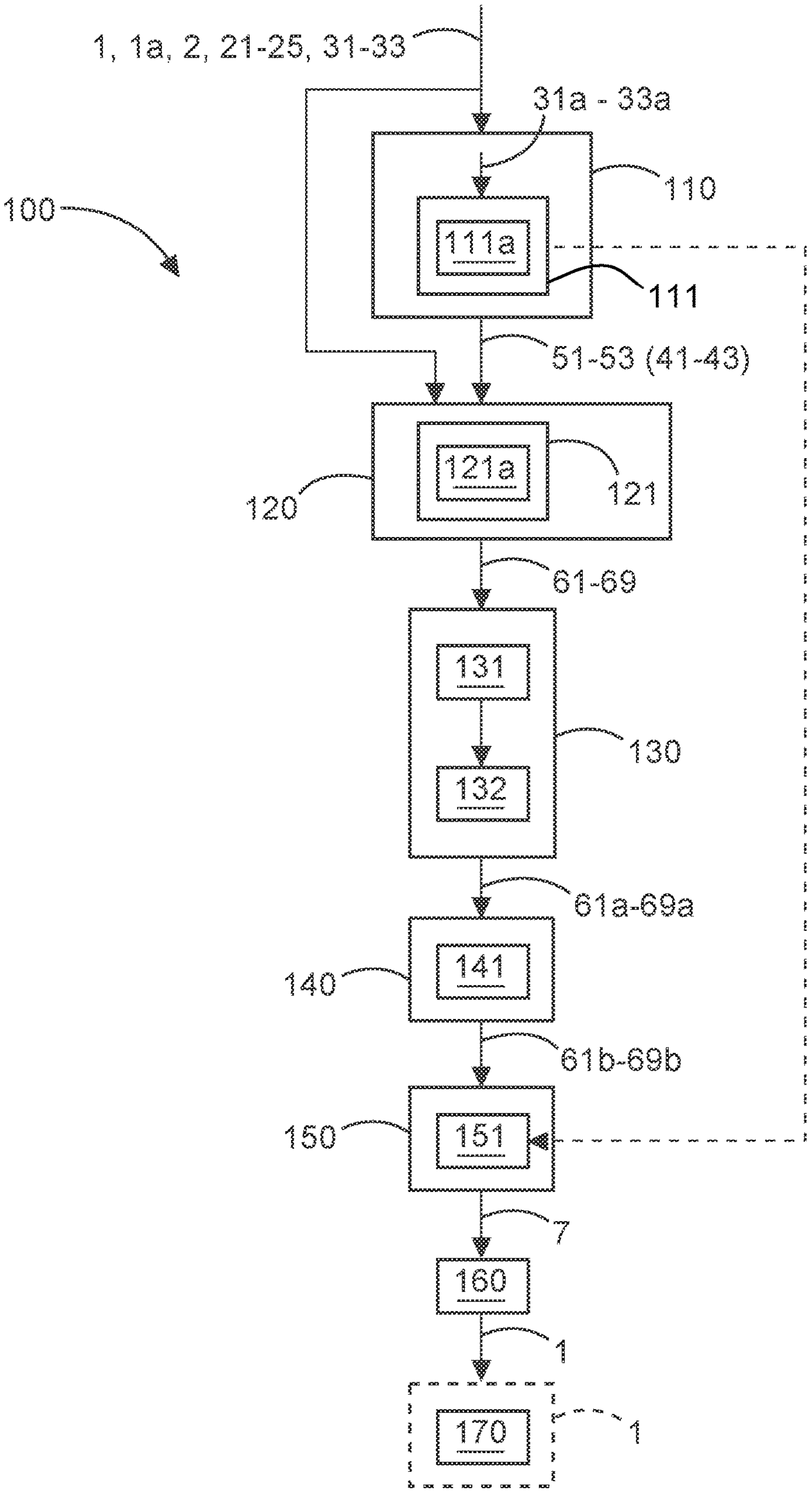
FIG. 1 is a flowchart for a method in accordance with the disclosure.

FIG. 1 is a schematic flow chart of an exemplary embodiment of a method 100 for optimizing the execution of a given industrial process 1*a* on a modular industrial plant 1. The modular industrial plant 1 is made of a plurality of process modules 21-25 that are selected from a pool 2 of available process modules. Each process module 21-25 is configured to provide one or more services 31-33. For the sake of readability, the same reference numerals 31-33 are used for the services provided by the different process modules 21-25, even though, e.g., the service 31 provided by process module 21 may do something completely different than the service 31 provided by process module 22. Each service 31-33 has multiple states 41-43 that it can go through while providing the service 31-33.

In step 110, for each state 41-43 of each service 31-33 provided by each of the available process modules 21-25, a set of resource indicators 51-53 is provided. Each resource indicator 51-53 is indicative of an amount of a resource that is required and/or produced by virtue of this particular service 31-33 being in this particular state 41-43. For example, the "industrial process" 1*a* of doing the laundry may be performed by a washing machine as the first process module 21 and a dryer as the second process module 22. The washing machine as the first process module 21 may have filling, heating, washing, pumping and spinning as states 41-43. The dryer as the second process module 22 may have drying and cooling as states 41-43.

According to block 111, at least one resource indicator 51-53 may be dependent on at least one continuous parameter 31*a*-33*a* that characterizes a manner of executing the service 31-33. According to block 11*a*, the at least one continuous parameter 31*a*-33*a* may then determine a balance between a higher speed of executing a service 31-33 and a lower resource requirement of this service 31-33. In the example of doing the laundry, the continuous parameter 31*a*-33*a* may be the amount of water that is used. The more water is used, the faster the washing cycle can finish, at the price of using more energy to heat the increased amount of water. The RPM rotation speed of the drum during spinning is another continuous parameter that determines energy consumption of the motor during spinning.

In step 120, based at least in part on the given industrial process 1*a* and on the pool 2 of available process modules, a set of candidate programs 61-69 for execution of the process 1*a* is determined. Each program 61-69 comprises a sequence of states 41-43 of services 31-33 of process modules 21-25 that accomplishes the given industrial process 1*a*, while at the same time the resource requirements 51-53 of all services 31-33 in the sequence are fulfilled.

In the example of doing the laundry, swapping the order of washing and drying will not successfully accomplish the given process 1*a*, because the end result is clean but wet laundry.

In step 130, based on the sequence of states 41-43 of services 31-33 and their respective resource indicators 51-53, a set of overall resource requirements 61*a*-69*a* for executing the given industrial process 1*a* according to the candidate program 61-69 is determined.

For example, the process of doing the laundry consumes electricity, water, detergent and time. As discussed above, using less water will also lead to less electricity usage, but more time consumption. Also, in the determining of the overall resource requirements 61*a*-69*a*, interdependencies between services 31-33 come into play. For example, it may be attempted to save some electricity by spinning the motor of the washing machine at a lower RPM speed during the final spinning stage. But then the laundry will be wetter, so the savings will likely be over-compensated by an increased electricity usage of the dryer.

According to block 131, when determining overall resource requirements 61*a*-69*a*, requirements of multiple services 31-33 for at least one resource may be added. According to block 132, amounts of this resource provided by at least one service 31-33 to at least one other service may then be subtracted from the requirement. For example, if the water for the washing machine is pre-heated by solar-thermal panels, then the washing machine will use less electricity for heating the water.

In step 140, based at least in part on said overall resource requirements 61*a*-69*a*, a figure of merit 61*b*-69*b* for the candidate program 61-69 is determined.

According to block 141, the figure of merit 61*b*-69*b* may depend on one or more of: a total amount, and/or a total cost, of at least one resource that is needed for executing the industrial process 1*a*; a maximum amount of at least one resource that is needed at any one time during execution of the industrial process 1*a*; a total cost for all resources consumed by execution of the industrial process 1*a*; and a total time for execution of the industrial process 1*a*.

According to block 121, to obtain a new candidate program 61-69, a previous candidate program 61-69 may be modified such that its sequence of states 41-43 still accomplishes the given industrial process 1*a*; and the resource requirements of all services 31-33 in the sequence are still fulfilled.

According to block 121*a*, a direction in which to modify the candidate program 61-69 may then be is determined based at least in part on figures of merit 61*b*-69*b* obtained for multiple candidate programs 61-69.

In step 150, a candidate program 61-69 with the best figure of merit 61*b*-69*b* is determined as the optimal program 7 for executing the given industrial process 1*a*.

According to block 151, provided that at least one resource indicator 51-53 depends on a continuous parameter 31*a*-33*a* according to block 111, the determining of a candidate program 61-69 with the best figure of merit 61*b*-69*b* may comprise optimizing the at least one continuous parameter 31*a*-33*a* to maximize the figure of merit 61*b*-69*b*.

In the example shown in FIG. 1, in step 160, physical process modules 21-25 from the pool 2 of available process modules 21-25 are linked together according to the optimal program 7, so as to form the modular industrial plant 1. In step 170, the given industrial process 1*a* is then executed on the so-obtained modular industrial plant 1.

Figure 2:
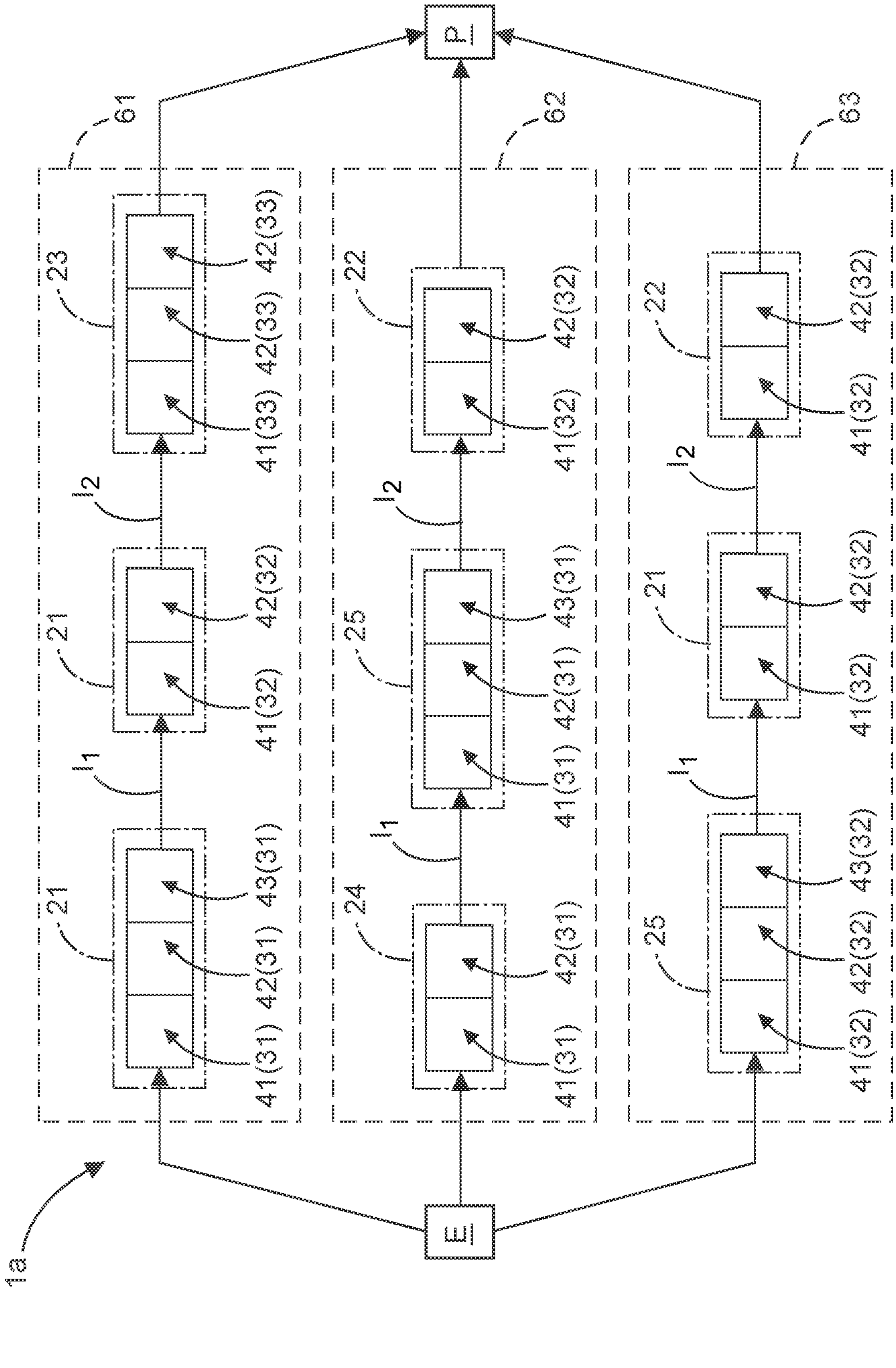
FIG. 2 is a block diagram for a system in accordance with the disclosure.

FIG. 2 illustrates three different candidate programs 61-63 for executing one and the same given industrial process 1*a* that leads from one or more educts E to a product P.

According to the first candidate program 61, the educts E are processed into a first intermediate product I1 by means of service 31 of process module 21. On its way from start to finish, this service 31 proceeds from state 41(31) through state 42(31) and finally to state 43(31). The first intermediate product I1 is then processed into a second intermediate product I2 by means of service 32 of process module 22. This service 32 moves through only two states 41(32) and 42(32). The second intermediate product I2 is processed into the final product P by means of service 33 of process module 23. This service 33 again has three states 41(33), 42(33) and 43(33) through which it will move until completion.

According to the second candidate program 62, the educts E are processed into the first intermediate product T1 by means of service 31 provided by another process module 24. Service 31 has only two states 41(31) and 42(31). The first intermediate product I1 is processed into the second intermediate product I2 by means of another service 31 provided by another process module 25. This service 31 has three states 41(31), 42(31) and 43(31). The second intermediate product I2 is processed into the final product P by means of service 32 provided by process module 22. This service 32 has two states 41(32) and 42(32).

The third candidate program 63 uses a rearrangement of the process modules 21-25. Rather than using service 31 provided by process module 25 to go from the first intermediate product I1 to the second intermediate product I2, another service 32 of this process module 25 having three states 41(32), 42(32) and 43(32) is now used to process the educts E into the first intermediate product I1. Like in the first candidate program 61, service 32 of process module 21 having states 41(32) and 42(32) is used for processing the first intermediate product I1 into the second intermediate product I2. Like in the second candidate program 62, service 32 provided by process module 22 is used for processing the second intermediate product I2 into the final product P. Thus, the third candidate program 63 comprises: an element from the first candidate program 61, namely the use of service 32 of process module 21 to go from I1 to I2; an element from the second candidate program 62, namely the use of service 32 of process module 22 to go from I2 to P; and a variation of another element from the second candidate program 62, namely the use of service 32 (instead of service 31) of process module 25 to go from E to I1 (instead of from I1 to I2).

In the following, the invention will be described using Figures without any intention to limit the scope of the invention. FIG. 1 is a flowchart for an exemplary embodiment of the method 100 for optimizing the execution of a given industrial process 1*a*. FIG. 2 is a block diagram of different candidate programs 61-63 for executing one and the same industrial process 1*a*.

A resource can be any property or commodity that is required for the service to operate in the particular state. For example, the resource may comprise a state quantity, such as a temperature or a pressure of a medium inputted into the module, an environment temperature at the location of the process module, or a base pressure of a vacuum generated inside the process module. But the resource may also comprise any consumable required by the process module, such as electricity, gas or water.

For example, if the resource comprises energy, an energy model may be applied to every state of a service. For example, if it is already known how much energy the process module will consume in which state, this energy model may be pre-defined. But there are other ways to determine the energy model. For example, it may be estimated by measuring the energy balance during the process, or in similar processes in similar plants.

Energy models could be developed manually but could also be created from historical data of already in use process modules. Possibly additional measurements might be required (e.g., electrical meter or temperature sensor) which could be just applied temporarily to retrieve the model. An algorithm could propose where to put these sensors and where to make these measurements to get a good/sufficient energy model. Here, non-invasive measurement methods might be a good fit.

Energy models can be developed for several procedures of a service (or a single procedure having pre-defined parameter sets). A variant could for example be implemented to save energy, but in turn take longer for a certain task. Then the engineer or a supervisory control system, such as the manufacturing execution system, MES, scheduling system, a process control system, PCS, or a distributed control system, DCS, could decide whether this procedure or the faster one should be used.

Modeled runs can be compared with the actual monitored process values from the module. The difference between the predicted and the actual values can be used 1) to tune/improve the model and 2) to detect/predict changes in the physical module, e.g., due to aging.

In case the pipes between the modules influence a commodity exchanged between the modules or a resource indicator, some equation for in between, and/or some way to add this piece to the predecessor or successor module, might even help to fine-tune the modelling. Something like an energy-loss per meter tube with respect to specific tube materials/isolation. For example, if the pipes are long and possibly not insulated, heat from a heated fluid exchanged between modules is lost. Also, if the pipes have a smaller diameter, fluid may flow slower, and/or at a higher pressure, between modules.

Based at least in part on the given industrial process and on the pool of available process modules, a set of candidate programs for execution of the process is provided. Each such program comprises a sequence of states of services of process modules that meets the following two criteria: The sequence accomplishes the given industrial process; and the resource requirements of all services in the sequence are fulfilled.

The first condition depends only on the sequence of states of events itself. The second condition may also depend on the availability of resources on site, such as a maximum amount of electricity or a maximum available cooling power.

Based on the sequence of states of services and their respective resource indicators, a set of overall resource requirements for executing the given industrial process according to the candidate program is determined. Based at least in part on these overall resource requirements, a figure of merit for the candidate program is determined. For example, different resource requirements may be weighted with respect to one another according to cost and/or scarcity. In particular, the overall resource requirements may be time-dependent. That is, they may indicate how much of particular resources is needed at any one time. In this manner, resource bottlenecks may be identified.

A candidate program with the best figure of merit is determined as the optimal program for executing the given industrial process.

Thus, the basic course of action is that, from the given industrial process, one or more time programs of states of particular services needed to execute the industrial process follow. Each such time program has a well-defined set of overall requirements for resources, and this in turn determines the figure of merit that decides which time program, i.e., which candidate program for execution of the process, is optimal.

It was found that the coupling of process modules for the sake of executing the process has two effects. On the one hand, when adding a new process module, the resource requirements of the new process module come on top of the resource requirements of the already present modules. On the other hand, one module may already produce what the other module needs. For example, if one process module already heats a certain substance up for performing one step of the process, and another step of the process requires the substance to be hot as well, it is beneficial to perform this other step at a time where the substance is still hot, without expending additional energy to re-heat it. Also, if a process module benefits from a warm environment temperature, it should be placed in a plant area where other process modules already generate such a warm environment temperature.

Such considerations have not been made in the prior art. It has not even be systematically established which resources, and in particular which quantities of which resources, a process module needs when a service provided by the process module is in a particular state.

Basically, the total set of requirements compiled across the whole process can be understood as a big resource vector with a lot of components, each of which may have a different physical dimension. For each component, a service provides, depending on its state, source and sink terms.

The optimization problem is a discrete problem because the possible configuration of process modules, as well as services provided by each process module, are discrete. You can have the service, e.g., in state 2 or 3 out of 5, but you cannot have it in state 2.5. Such discrete problems are more difficult to solve than continuous problems because many numerical optimization methods that search for a global optimum cannot be used. There are a number of search strategies that may be applied in the space of discrete configurations of process modules, and thus in the space of candidate programs for execution of the process. However, it is hard to guarantee that a global optimum, rather than a local optimum, will be found. But this is not a problem. Whatever search strategy is used, it can be expected to yield an improvement of at least a few percent in resource efficiency. This is the same order of magnitude as the margin of profit for many processes. This means that said small difference in resource efficiency can already make the difference between profit and loss.

Apart from arranging that one process module produces or causes what another one needs, one way of optimizing the program for a better figure of merit is to focus the overall resource requirements onto certain resources, and/or on certain times. For example, if one resource is much more abundant than another one, then the process execution may be modified such that more of the abundant resource is used. For example, if natural gas for a heating process in a process module runs scarce, this may be exchanged for a process module that uses oil or electricity as heating energy. Also, resource requirements may be focused on particular times where costs for resources are low. For example, electricity prices may vary greatly during the day based on the difference between supply and demand. To postpone a requirement of a high electricity usage at a time of day where prices are highest, it may, for example, be advantageous to store a product of one process module until a time where electricity is cheaper again.

If at least one resource is energy, the following exemplary strategies may be applied to improve energy efficiency: predict the process energy balance during a specific process operation state; suggest coupling of process modules to the engineer in a way that sector coupling and/or heat recovery/heat exchange is achieved; process modules producing heat, for example, by exothermic reaction or similar, are somehow coupled with process modules requiring heat for e.g., heat exchangers. This case would count as “circular economy” in the plant setup and could help achieve plant owners’ KPIs in this context (e.g., in a Mission2Zero political campaign, etc.); suggest good physical arrangement (E.g., have short ways for heat recovery? Reduce ways according to heat level transferred? Suggest insulation of inter-module connections depending on distance and heat level or other?) of process module instances. This use case allows the involvement of 1) physical models of piping and 2) additional models of the environment, its cooling capacity; and suggest heat recovery (or process energy recovery in general) arrangements of the process modules.

In a particularly advantageous embodiment, at least one resource is a state quantity that relates to the process module, to a medium that is inputted into the process module, and/or to the environment of the process module. An amount of a requirement and/or production of this resource comprises a value of the state quantity. As discussed before, this may be used to bring process modules that need particular values of the state quantity together with process modules that cause these values of the state quantity, such as environment temperature.

In another particularly advantageous embodiment, at least one resource is a consumable of the industrial process. Notable examples are energy (such as electricity or fuel), water, cooling power, and materials used in the industrial process itself (such as educts of a chemical process).

Chemical processes are prime examples for application of the present method. Other prime examples are mining operations. Here, the industrial process is the conversion of rock with embedded resources into raw resources, such as ore or coal. The process modules are the many machines that need to work hand in hand in order to make this conversion happen. A similar example is oil and gas production, where a large park of machinery collaborates towards the final product (crude oil, respectively natural gas), as well.

In a further particularly advantageous embodiment, the determining of overall resource requirements comprises: adding requirements of multiple services for at least one resource; and subtracting amounts of this resource provided by at least one service to at least one other service. In this fashion, it can be encouraged that process modules help each other out with resources, rather than requiring that all needed resources be fed into the process from the outside.

In a further advantageous embodiment, at least one resource indicator is dependent on at least one continuous parameter that characterizes a manner of executing the service. For example, such a parameter may be a process parameter of a chemical reaction. For some process, there is a certain amount of freedom in the space of parameters; within these limits, the parameters may be changed without substantially changing the end result. For example, there may be a certain area in a space spanned by the temperature and the pressure of a chemical reaction such that the result of the reaction remains substantially the same. But the concrete value of temperature and pressure may, for example, impact the speed and the resource consumption. In the example of the washing machine presented above, the amount of water used for the washing process and the duration of the main washing phase define a similar area. Of course, the size of the area is limited. It is neither feasible to wash without any water nor to wait 24 hours for the machine to finish.

In particular, as in the example of the washing machine, the at least one continuous parameter may determine a balance between a higher speed of executing a service and a lower resource requirement of this service. For example, the speed of a chemical reaction may increase with the temperature, but this increases the energy consumption for heating.

In a further particularly advantageous embodiment, the determining of a candidate program with the best figure of merit comprises optimizing the at least one continuous parameter to maximize the figure of merit. To this end, any suitable numerical optimization algorithm may be used. For example, a search in the space of the discrete parameters of candidate programs (such as which state to move to next) may be combined with this numerical optimization.

The figure of merit may be used to express different goals with respect to optimizing the execution of the process, and also to weigh these goals against one another. Therefore, in a particularly advantageous embodiment, the figure of merit depends on one or more of: a total amount, and/or a total cost, of at least one resource that is needed for executing the industrial process; a maximum amount of at least one resource that is needed at any one time during execution of the industrial process; a total cost for all resources consumed by execution of the industrial process; and a total time for execution of the industrial process.

One resource that is always consumed when an industrial process is executed is maintenance of the process modules and other hardware. This resource can be seamlessly integrated into the determining of the figure or merit. In this manner, for example, maintenance can be scheduled intelligently, such that the cost is minimized. The maintenance itself cannot be avoided, but part of the cost can.

In a further particularly advantageous embodiment, at least one process module comprises at least one further nested process module. In this manner, models for describing the execution of services and the behavior of process modules may be re-used in more instances.

As discussed above, a search for an optimal figure of merit in a space spanned by discrete parameters and decisions is more difficult than a search in a space spanned by continuous parameters for which many numerical optimization methods are available. But the search in the discrete parameter space may still built on previous experience in order to improve further. To this end, in a further particularly advantageous embodiment, the determining of a set of candidate programs comprises: modifying a previous candidate program such that: its sequence of states still accomplishes the given industrial process; and the resource requirements of all services in the sequence are still fulfilled.

In particular, a direction in which to modify the candidate program may be determined based at least in part on figures of merit obtained for multiple candidate programs. In this manner, at least a general direction may be established without requiring that the dependency of the figure of merit on the parameters be differentiable.

In a further particularly advantageous embodiment, physical process modules from the pool of available process modules are linked together according to the optimal program. This forms the modular industrial plant. The given industrial process is executed on the so-obtained modular industrial plant. In this manner, the projected improvement that is reflected in the figure of merit is realized.

Because it is computer-implemented, the present method may be embodied in the form of a software. The invention therefore also relates to a computer program with machine-readable instructions that, when executed by one or more computers and/or compute instances, cause the one or more computers and/or compute instances to perform the method described above. Examples for compute instances include virtual machines, containers or server-less execution environments in a cloud. The invention also relates to a machine-readable data carrier and/or a download product with the computer program. A download product is a digital product with the computer program that may, e.g., be sold in an online shop for immediate fulfilment and download to one or more computers. The invention also relates to one or more compute instances with the computer program, and/or with the machine-readable data carrier and/or download product.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

1 modular industrial plant
1*a* given industrial process
2 pool of available process modules 21-25
21-25 process modules
31-33 services provided by process modules 21-25
31*a*-33*a* continuous parameter of service 31-33
41-43 state of service 31-33
51-53 resource indicators of states 41-43
61-69 candidate programs for executing industrial process 1*a*
61*a*-69*a* overall resource requirements for candidate programs 61-69
61*b*-69*b* figures of merit for candidate programs 61-69
7 optimal program for executing process 1*a*
100 method for optimizing execution of process 1*a*
110 providing resource indicators 51-53
111 considering continuous parameter 31*a*-33*a*
111*a* choosing parameter 31*a*-33*a* that determines a balance
120 determining candidate programs 61-69
121 modifying previous candidate program 61-69
121*a* modifying based on previous figures of merits 61*b*-69*b*
130 determining overall resource requirements 61*a*-69*a*
131 adding requirements of multiple services 31-33
132 subtracting resources provided by other services 31-33
140 determining figures of merit 61*b*-69*b*
141 choosing particular figures of merit 61*b*-69*b*
150 determining optimal program 7
151 optimizing continuous parameter 31*a*-33*a*
160 linking process modules 21-25 together as per optimal program 7
170 executing industrial process 1*a* on modular industrial plant 1
E educts of process 1*a*
$I_1$, $I_2$ intermediate products of process 1*a*
P final product of process 1*a*

What is claimed is:

1. A computer-implemented method for optimizing the execution of a given physical industrial process on a modular industrial plant, the modular industrial plant comprising a plurality of process modules selected from a pool of available process modules for performing physical operations of the given industrial process, wherein each process module is configured to provide one or more services, the method comprising:

providing for each state of each service provided by each of the available process modules a set of resource indicators, wherein each resource indicator is indicative of an amount of a resource that is required or produced by the particular service being in a particular state;

determining based at least in part on the given industrial process and on the pool of available process modules a set of candidate programs for execution of the process, wherein each program comprises a sequence of states of services of process modules, such that the sequence accomplishes the given industrial process and the resource requirements of all services in the sequence are fulfilled;

determining based on the sequence of states of services and their respective resource indicators a set of overall resource requirements for executing the given industrial process according to the candidate program;

determining based at least in part on said overall resource requirements a figure of merit for the candidate program;

determining a candidate program with the best figure of merit as the optimal program for executing the given industrial process on the modular industrial plant;

linking together physical process modules from the pool of available process modules according to an optimal program to form the modular industrial plant; and executing the given industrial process on the so-formed modular industrial plant to perform the physical operations.

2. The method of claim 1, wherein at least one resource is a state quantity that relates to the process module to a medium that is inputted into the process module or to the environment of the process module; and wherein an amount of a requirement or production of the resource comprises a value of the state quantity.

3. The method of claim 1, wherein at least one resource is a consumable of the industrial process.

4. The method of claim 1, wherein the determining of overall resource requirements comprises adding requirements of multiple services for at least one resource; and subtracting amounts of the resource provided by at least one service to at least one other service.

5. The method of claim 1, wherein at least one resource indicator is dependent on at least one continuous parameter that characterizes a manner of executing the service.

6. The method of claim 5, wherein the at least one continuous parameter determines a balance between a higher speed of executing a service and a lower resource requirement of the service.

7. The method of claim 5, wherein the determining of a candidate program with the best figure of merit comprises optimizing the at least one continuous parameter to maximize the figure of merit.

8. The method of claim 1, wherein the figure of merit depends on one or more of:

a total amount, or a total cost, of at least one resource that is needed for executing the industrial process;

a maximum amount of at least one resource that is needed at any one time during execution of the industrial process;

a total cost for all resources consumed by execution of the industrial process; and a total time for execution of the industrial process.

9. The method of claim 1, wherein at least one process module comprises at least one further nested process module.

10. The method of claim 1, wherein the determining of a set of candidate programs comprises modifying a previous candidate program such that its sequence of states accomplishes the given industrial process; and the resource requirements of all services in the sequence are fulfilled.

11. The method of claim 10, wherein a direction in which to modify the candidate program is determined based at least in part on figures of merit obtained for multiple candidate programs.

* * * * *